J. P. NIKONOW.
AUTOMATIC TRANSMISSION GEARING.
APPLICATION FILED NOV. 28, 1913.
1,235,047.
Patented July 31, 1917.
2 SHEETS—SHEET 1.
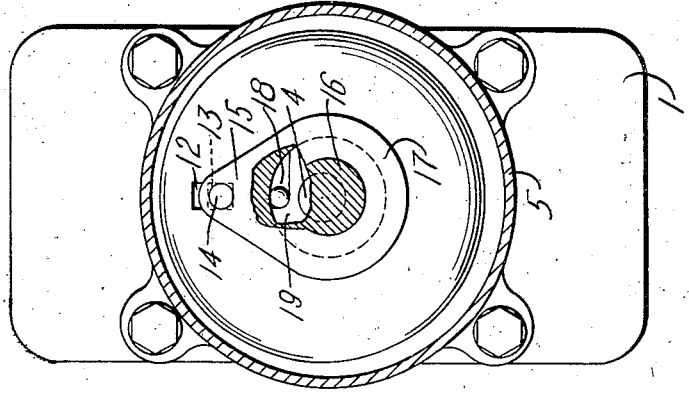
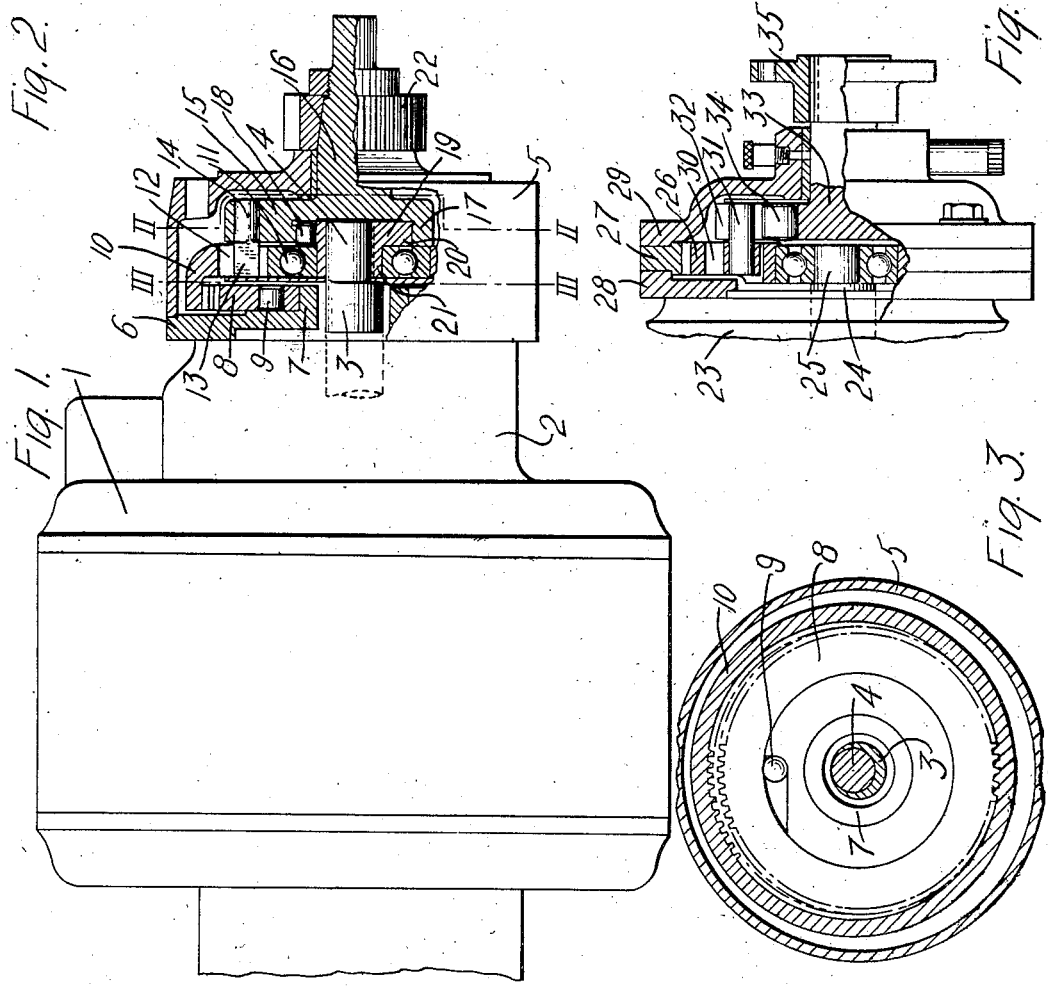
WITNESSES:
Fred A. Lind.
J. R. Langley.
INVENTOR
John P. Nikonow
BY
Wiley S. Carr
ATTORNEY J. P. NIKONOW.
AUTOMATIC TRANSMISSION GEARING.
APPLICATION FILED NOV. 28, 1913.
1,235,047.
Patented July 31, 1917.
2 SHEETS—SHEET 2.
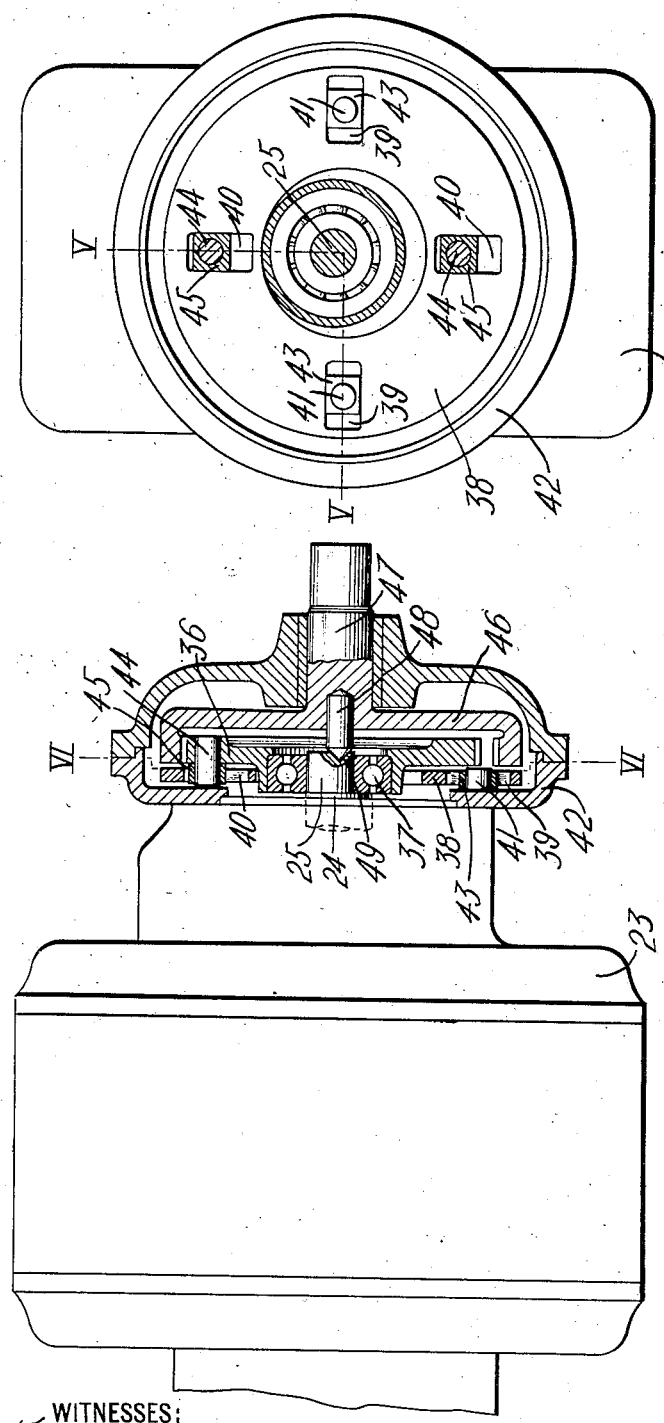
WITNESSES:
Fred. A. Lind.
J. R. Langley.
INVENTOR
John P. Nikonow
BY
Wesley J. Carr
ATTORNEY

UNITED STATES PATENT OFFICE.

JOHN P. NIKONOW, OF PITTSBURGH, PENNSYLVANIA, ASSIGNOR TO WESTINGHOUSE ELECTRIC AND MANUFACTURING COMPANY, A CORPORATION OF PENNSYLVANIA.

AUTOMATIC TRANSMISSION-GEARING.

1,235,047.   Specification of Letters Patent.   Patented July 31, 1917.

Application filed November 28, 1913. Serial No. 803,410.

*To all whom it may concern:*

Be it known that I, JOHN P. NIKONOW, a subject of the Czar of Russia, and a resident of Pittsburgh, in the county of Allegheny and State of Pennsylvania, have invented a new and useful Improvement in Automatic Transmission-Gearing, of which the following is a specification.

My invention relates to automatic transmission gearing and it has special reference to such gearing mechanisms as may be employed for operatively connecting the armature shafts of dynamo-electric machines to the shafts of internal combustion engines.

The object of my invention is to provide a transmission mechanism that is simple in construction and compact in arrangement and which operates automatically to change the gear ratio between two rotatable parts when the driving member becomes the driven member.

It is highly desirable, in the interests of economy of space and of a neat appearance, that the gear mechanism employed between a starting motor and a gas engine be arranged in a very compact manner and that the sizes of the various parts be limited. It is also essential that the gear mechanism have a large speed reduction in order that a small high-speed motor may be employed to rotate the engine shaft.

I have provided a system of epicyclic gear mechanism which occupies only a small space and is contained in a housing which may constitute part of the frame structure of the dynamo-electric machine. A large reduction in speed is provided when the generator acts as a motor, and a second and lower speed ratio is automatically employed when the engine operates the generator.

In the accompanying drawings, Figure 1 is a side view, partially in elevation and partially in section, of a dynamo-electric machine with my invention applied thereto. Fig. 2 is a sectional view on line II—II of Fig. 1. Fig. 3 is a sectional view on line III—III of Fig. 1. Fig. 4 is a view, similar to Fig. 1, with parts broken away, of a modification. Fig. 5 is a side view, in elevation, of a dynamo-electric machine with a further modification of my invention applied thereto, the transmission mechanism being shown in section on line V—V of Fig. 6. Fig. 6 is a sectional view on line VI—VI of Fig. V.

A dynamo-electric machine 1, which may be operated either as a generator or as a motor, comprises an end casing 2 and an armature shaft 3. The armature shaft 3 is provided, at its front end, with a reduced cylindrical portion 4 that is eccentric with respect to the axis of the shaft to form a crank. A housing 5, which is attached in any suitable manner to the end casing 2, incloses the reduction gear mechanism. The end wall 6 of the housing 5 is provided with a flanged portion 7 which surrounds the armature shaft 3. A gear wheel 8 is rotatably mounted upon the flange 7 and is adapted to be connected thereto by a one-way clutch 9 of the usual type when the dynamo-electric machine operates as a motor. Coacting with the gear wheel 8, is an internal gear wheel 10 which is mounted upon a roller bearing 11 carried by the crank 4. The gear wheels 8 and 10 are of such diameters that, when they are in mesh at one point, the diametrically opposite gear teeth have a clearance sufficient to allow a relative angular movement between the same. The gear wheels 8 and 10 are always in mesh at some point upon their circumferences, depending upon the angular position of the crank 4. The ratio of the gear wheels 8 and 10 may be small so that only a slight relative movement occurs when the gear wheel 10 is made to roll upon the gear wheel 8 by the eccentric movement of the crank 4.

The gear wheel 10 is provided with a rectangular slot 12 to receive the square end portion 13 of a pin 14 which has a slidable movement therein. The pin 14 is carried by an arm 15 that is integral with a shaft 16. The shaft 16 is provided with a flange portion 17 which is adapted to be engaged by a roller clutch 18 when the dynamo-electric machine is being driven through the shaft 16. A collar member 19 of the clutch 18, which is mounted upon and keyed to the crank 4, comprises a main portion 20 that is in axial alinement with the armature shaft 3 and the shaft 16, and a sleeve portion 21 that extends inside the ball bearing 11. A pinion 22 is mounted upon the shaft 16 and may be connected with any suitable coacting member connected to the shaft of a gas engine (not shown).

When the dynamo-electric machine is operated as a motor through any suitable electrical connections, the armature shaft 3 rotates in a clockwise direction (Fig. 3). The crank 4 revolves the gear wheel 10 about the axis of the shaft 3 and causes it to roll upon the gear wheel 8, one revolution of the gear wheel 10 occurring during each revolution of the armature shaft. The gear wheel 10, having the larger diameter, will advance in a clockwise direction relatively to the gear wheel 8, and the reaction upon the latter will cause it to tend to rotate in the opposite or counter-clockwise direction, whereupon it will be locked to the flange 7 by the roller clutch 9. The rotation of the gear wheel 10 causes a corresponding rotation of the shaft 16 by means of the pin 14 and the arm 15. The reduction in speed depends upon the ratio between the gear wheels 8 and 10; the smaller the ratio, the greater the reduction, as will be readily understood. The armature shaft and the collar 19 rotate in the same direction as the shaft 16, the clutch 18 permitting the collar 19 to overrun the shaft.

When the shaft 16 becomes the driving member, as, for example, when a gas engine has been started, the clutch 18 will operate to connect the shaft 16 to the collar 19. The rotation of the gear wheel 10 about its axis actuates the gear wheel 8 in a direction opposite to the reaction produced by the revolution of the gear wheel 10 about the axis of the armature shaft 3, and the roller clutch 9 is therefore disengaged to allow the gear wheel 8 to rotate with the gear wheel 10. The entire mechanism will then rotate as a unit, and the armature will be driven at a 1 to 1 ratio with the driving member. The dynamo-electric machine is thus driven as a generator at approximately engine speed.

A modification is shown in Fig. 4, in which the mechanism is adapted for the transmission of power in one direction only, as, for example, in connection with motors which are employed for starting gas engines. A motor 23, part of which is broken away, is provided with a shaft 24 having a reduced cylindrical portion 25 extending from the end of the same to form a crank similar to the crank 4 of Figs. 1, 2 and 3.

A gear wheel 26, which is rotatably mounted upon the crank 25, is revolved by the latter, as the armature shaft 24 rotates, and thus caused to roll upon a stationary internal gear wheel 27. The gear wheel 27 is rigidly clamped between two casing members 28 and 29. The gear wheel 27 is provided with a slot 30 to receive a pin 31 that is carried by a collar 32. A shaft 33, that is in axial alinement with the armature shaft 24, is adapted to be connected to the collar 32 by a one-way roller clutch 34 when the motor is operating. The clutch 34 will, however, permit the shaft 33 to overrun the collar 32. The shaft 33 is provided with a clutch member 35 for endwise connection to a driven mechanism as, for example, to a suitable rotatable part of a gas engine (not shown).

The rotation of the armature shaft 24 causes the gear wheel 26 to roll upon the stationary gear wheel 27 and thereby cause a relative rotation of the same. The pin 31 actuates the collar 32 to rotate the shaft 33 by means of the roller clutch 34. When the speed of the driven mechanism exceeds that of the collar 32, the clutch 34 allows the shaft 33 to overrun the collar.

A further modification is illustrated in Figs. 5 and 6 in which like numerals designate corresponding parts. A motor 23 is provided with an armature shaft 24 having a reduced portion 25 that is eccentric to the axis of the armature shaft. A gear wheel 36 is rotatably mounted upon the eccentric or crank portion 25 by means of a ball bearing 37. Rotation of the gear wheel 36 is prevented by a plate member 38 having two pairs of oppositely disposed rectangular slots 39 and 40. Pins 41, which are fixed to a casing member 42, project into the slots 39 and are provided with bearing members 43 for sliding engagement with the sides of the slots 39. Pins 44, which are fixed to diametrically opposite points of the gear wheel 36, are provided with bearing members 45 that coact in a similar manner with the slots 40.

As thus arranged, the plate member 38 can oscillate laterally relatively to the casing member 42, and the gear wheel 36 can oscillate vertically relatively to the plate member 38. The gear wheel 36 can, therefore, move in all directions relatively to the stationary parts, a distance equal to the slidable movement of the several bearing members 43 and 45 in the respective slots 39 and 40. This distance is equal to the eccentricity or throw of the crank arm 25. An internal gear wheel 46 coacts with the gear wheel 36 as it is oscillated by the rotation of the shaft 24. A driven shaft 47, which is coaxial with the motor shaft 24, is integral with the gear wheel 46 and may be connected in any suitable manner with a driven mechanism. A pin 48, which is carried by the shaft 47 and has a bearing at 49 in the shaft 24, serves to prevent undue relative movement in an axial direction of the several parts.

When the motor shaft 24 rotates, the gear wheel 36 is caused to oscillate vertically relatively to the plate member 38 and, at the same time, the plate member 38 oscillates laterally relatively to the stationary casing 42. The gear wheel 36, therefore, has a circular bodily movement without angular movement and the gear wheel 46 is caused to rotate in the same direction as the shaft 24 but at a greatly reduced rate.

I claim as my invention:

1. In a transmission mechanism, the combination with a driving member and a driven member, of means for operatively connecting said driving member to said driven member at a relatively high-speed ratio, said means comprising two coacting gear wheels, one of which is provided with a slot of substantially rectangular shape, means for connecting the driving member to one of said gear wheels to revolve it and thereby roll it upon the other, means comprising said slot for operatively connecting one of said gear wheels to said driven member, and means for directly connecting said members when the driven member becomes the driving member.

2. In a transmission mechanism, the combination with a stationary member, a gear wheel, and means for connecting said gear wheel to said stationary member, of a second gear wheel for coacting with the other gear wheel and having a radially extending slot of substantially rectangular shape, means comprising a shaft for imparting a gyratory motion to said second gear wheel, a second shaft, and means comprising a pin coacting with said slot for connecting said second gear wheel to said second shaft, and means for directly connecting said shafts when one of them becomes the driving shaft.

3. In a transmission mechanism, the combination with a stationary member, and two coacting gear wheels one of which is provided with a slot of substantially rectangular shape, of means for connecting one of said wheels to said stationary member, means comprising a shaft for causing the other gear wheel to roll upon the one, a driven member, and means comprising a pin operating in said slot for connecting said other gear wheel to the driven member, and means for directly connecting the driven member to the driving member when the latter becomes the driven member.

4. In a transmission mechanism, the combination with a shaft having an eccentric portion, a gear wheel rotatably mounted on said eccentric portion and provided with a radially extending slot, a second gear wheel for coacting therewith, means for retaining said second gear wheel in a stationary position, a second shaft in axial alinement with the other shaft and provided with a crank arm, and a pin on said arm for coacting with said slot, and means for directly connecting said shafts when one of them becomes the driving member.

5. In a transmission mechanism, the combination with a shaft having a crank portion, a gear wheel rotatably mounted on said crank portion, a second gear wheel for coacting therewith, means for preventing rotation of said second gear wheel in one direction, a second shaft in axial alinement with the other shaft and provided with an arm, a pin and slot connection between said arm and said second gear wheel, and means for locking said shafts together when the second shaft becomes the driver.

6. In a transmission mechanism, the combination with a stationary member, a gear wheel and means for locking said gear wheel to said stationary member, of a driving shaft having a crank portion, a second gear wheel rotatably mounted on said crank portion for coacting with the other gear wheel, a driven shaft operatively connected to said second gear wheel, and means for directly connecting said shafts when the driven shaft becomes the driver.

In testimony whereof, I have hereunto subscribed my name this 24th day of Nov. 1913.

JOHN P. NIKONOW.

Witnesses:
CHESTER B. MILLS,
B. B. HINES.